United States Patent

Ikehara et al.

Patent Number: 5,396,942
Date of Patent: Mar. 14, 1995

[54] PNEUMATIC RADIAL TIRES WITH CORE-SHEATH STEEL BELT CORDS

[75] Inventors: Kiyoshi Ikehara; Kiyohito Kawasaki, both of Tokyo, Japan

[73] Assignee: Bridgestone Corporation, Tokyo, Japan

[21] Appl. No.: 138,056

[22] Filed: Oct. 19, 1993

Related U.S. Application Data

[62] Division of Ser. No. 525,353, May 18, 1990, Pat. No. 5,311,917.

[30] Foreign Application Priority Data

May 22, 1989 [JP] Japan .................. 1-126684

[51] Int. Cl.$^6$ .................. B60C 9/18; B60C 9/20
[52] U.S. Cl. .................. 152/527; 57/212; 57/902; 152/526
[58] Field of Search .............. 152/451, 527, 556, 526; 57/902, 212, 215, 223

[56] References Cited

U.S. PATENT DOCUMENTS 4,690,191  9/1987  Kawasaki .................. 152/527
4,732,197  3/1988  Heishi et al. .................. 152/527 X

FOREIGN PATENT DOCUMENTS 60-169303  9/1985  Japan .................. 152/556

OTHER PUBLICATIONS

*Mechanics of Pneumatic Tires*, ed. Samuel Clark:US Dept. of Transportation, Aug. 1981, pp. 219–220.
"New developments in steel cords For tyres", *International Polymer Science and Technology* vol. 11 No. 10, 1984, pp. T153–T160.

Primary Examiner—Adrienne Johnstone
Attorney, Agent, or Firm—Sughrue, Mion, Zinn, Macpeak & Seas

[57] ABSTRACT

A pneumatic radial tire for truck and bus comprises a carcass ply containing cords arranged substantially in a radial direction of the tire and a belt superimposed about said carcass ply and comprised of plural belt layers each containing steel cords arranged at a cord angle of 5°–20° with respect to an equator of the tire. In this case, the steel cord for the belt layer has a two-layer structure of a core comprised of two steel filaments and a single sheath comprised of 6–8 steel filaments and satisfies the particularly relationships on filament diameter, twisting pitch, bending rigidity, tensile strength and distance between adjoining cords.

3 Claims, 3 Drawing Sheets

FIG_1
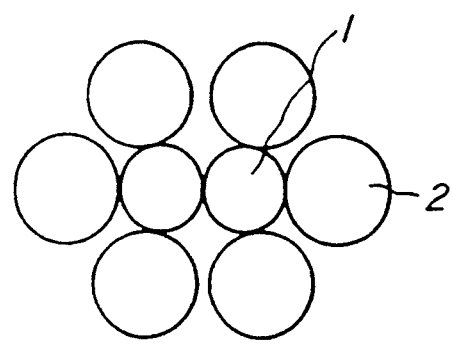
FIG_2
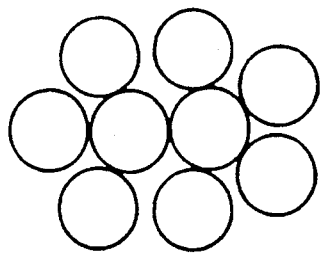
FIG_3
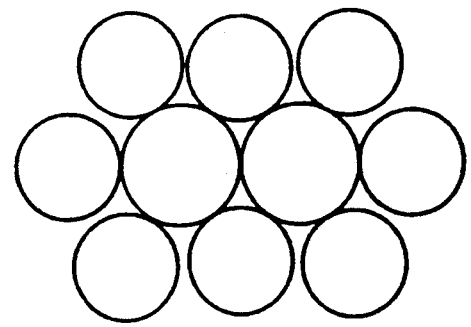

FIG_4
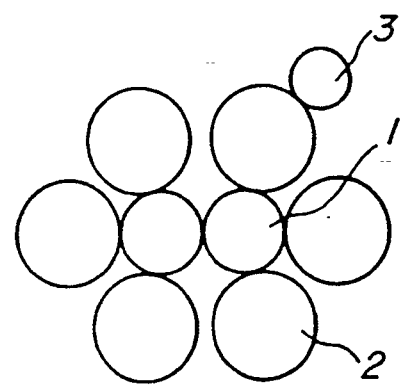
FIG_5
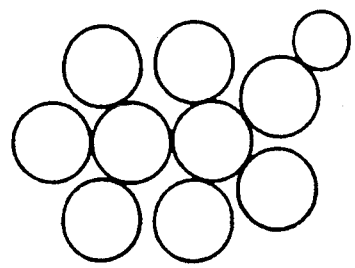
FIG_6
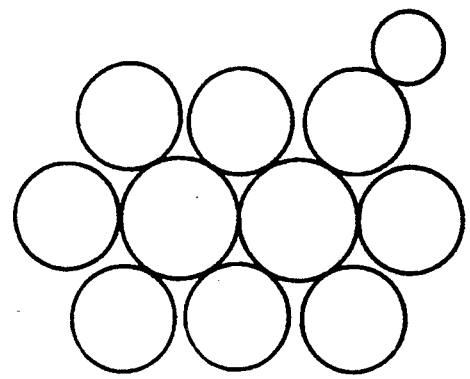

FIG_7
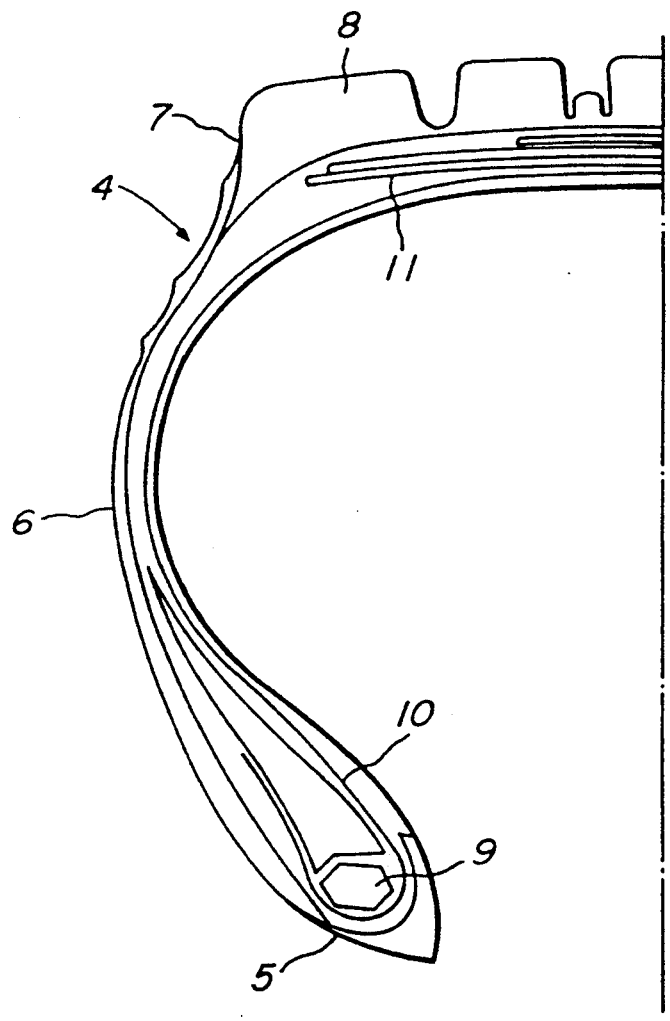
FIG_8
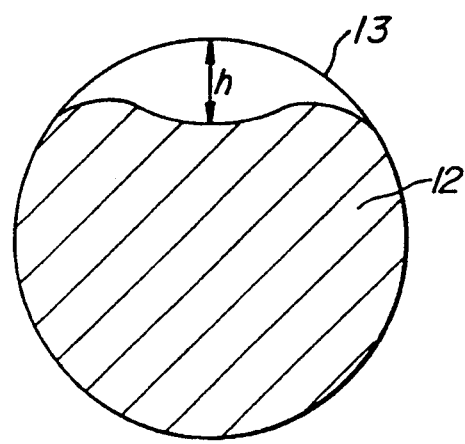

PNEUMATIC RADIAL TIRES WITH CORE-SHEATH STEEL BELT CORDS

This is a divisional of application Ser. No. 07/525,353 filed May 18, 1990, now U.S. Pat. No. 5,311,917.

BACKGROUND OF THE INVENTION

1. Field of the Invention

This invention relates to pneumatic radial tires, and more particularly to a pneumatic radial tire for use in truck and bus.

2. Related Art Statement

The conventional radial tire for truck and bus comprises a belt of at least three rubberized cord layers each containing steel cords arranged at a relatively small inclination angle with respect to the equator of the tire, cords of which layers crossing with each other, and a carcass composed of at least one rubberized cord ply containing cords arranged substantially perpendicular to the equator of the tire.

In the tire using cords as a reinforcing element for the belt, however, there is a problem that separation failure at the end of the belt (BES) results that in turn produces problems in the retreading and the safety.

The inventors have made studies with respect to the mechanism causing the above problem and confirmed that a crack is created in rubber surrounding a cord end at the end portion of the belt layer due to repetitive deformation of the belt layer during the running, particularly deformation in the face of the belt layer at the generation of side force and grows to connect the other crack created in the adjoining cord and hence causes the separation failure.

Furthermore, the inventors have made studies with respect to a relation of BES occurrence to various factors of the belt layer structure and confirmed that the bending rigidity of the steel cord itself reinforcing the belt layer and the distance between the adjoining cords largely affects the magnitude and creating time of BES.

That is, the bending rigidity of the steel cord itself affects the crack growth at the cord end, while the distance between the adjoining cords affects the easiness of connecting the cracks to each other.

In order to prevent the occurrence of such BES, the inventors have previously proposed in Japanese Utility Model laid open No. 61-206695 that the bending rigidity of the steel cord is made large by restricting a diameter of filaments constituting the steel cord to a range of 0.32–0.42 mm.

According to the above publication, the steel cord comprises a center basic structure (hereinafter referred to as core) and a coaxial layer surrounding it (hereinafter referred to as the sheath) so as to oppose the twisting direction of the filament in the core to the twisting direction of the filament in the sheath for improving the rubber penetrability. However, the filament of the core comes into contact with the filament of the sheath as a point, so that there is still room for the improvement of the resistance to fretting fatigue.

SUMMARY OF THE INVENTION

It is, therefore, an object of the invention to solve the aforementioned problems and to provide a pneumatic radial tire having improved resistance to belt end separation (BES resistance) and durability and retreading property of tire.

The aforementioned fretting fatigue is considered due to the fact that since the twisting directions of the filaments in the core and sheath constituting the cord are opposite, the filaments of the core and sheath come into contact with each other as a point to locally raise the surface pressure and also the relative movement in the deformation of the cord becomes large. For this end, the inventors had assumed that the resistance to fretting fatigue could be improved by twisting the filaments in the core and sheath in the same direction. However, in case of the twisting structure in the same direction, there are problems that the rubber penetrability is poor, the core will easily come out from the sheath during running and hence brings about a risk of piercing through the tire tube to cause puncture. In order to solve these problems, it is necessary to thoroughly penetrate rubber into the core to prevent the movement of the core.

Under the above circumstances, the inventors have made further studies and found that the above object can be achieved by twisting the core and sheath of the steel cord in the same direction and simultaneously setting the total bending rigidity of filaments constituting the steel cord and the breaking load of the steel cord to given ranges, respectively, and consequently the invention has been accomplished.

According to the invention, there is the provision of a pneumatic radial tire comprising a carcass ply containing cords arranged substantially in a radial direction of the tire and a belt superimposed about said carcass ply and comprised to plural belt layers each containing steel cords arranged at a cord angle of 5°–20° with respect to an equator of the tire, characterized in that (a) said steel cord has a two-layer structure comprising a core composed of two steel filaments and a single sheath surrounding said core and composed of 6 to 8 steel filaments, in which a twisting direction of said core is same as in a twisting direction of said sheath, and satisfies the following relationships:

$$0.22 \leq Dc \leq 0.44 \text{ (mm)},$$

$$0.22 \leq Ds \leq 0.50 \text{ (mm)},$$

$$12 \leq Ps \leq 22 \text{ (mm)},$$

$$1.0 \leq Ps/Pc \leq 4.0$$

wherein Dc is a diameter of steel filament in the core, Pc is a twisting pitch of the core, Ds is a diameter of steel filament in the sheath and Ps is a twisting pitch of the sheath;

(b) said steel cord has a bending rigidity B of not less than 100 kg.mm² calculated from the following equation:

$$B = 1.3 \times \Sigma_i B_i = 1.3 \times \Sigma_i (\pi D_i^4 / 64) \times 20{,}000$$

wherein $B_i$ is a bending rigidity of each steel filament and $D_i$ is a diameter of each steel filament;

(c) said steel cord has a breaking load S (kgf) satisfying the following relationship:

$$S \geq 110 \times (0.6 + D)$$

wherein D is a diameter (mm) of steel cord; and (d) said steel cords are arranged so that a distance G between adjoining cords is within a range of 0.6–2.0 mm in said belt layer.

BRIEF DESCRIPTION OF THE DRAWING

The invention will be described with reference to the accompanying drawing, wherein:

FIGS. 1 to 6 are schematically sectional views of various embodiments of the steel cord as a belt reinforcement according to the invention;

FIG. 7 is a partly sectional view of a pneumatic radial tire for truck and bus; and FIG. 8 is a schematic view illustrating an evaluation of fretting resistance.

DESCRIPTION OF THE PREFERRED EMBODIMENTS

The pneumatic radial tires according to the invention will be described concretely.

According to the invention, the steel cord consists of a core comprised of 2 steel filaments and a sheath surrounding the core and comprised of 6 to 8 steel filaments from a viewpoint of cord symmetry, internal pressure holding property and prevention from coming out of the filament. When the number of steel filaments for the core is 3, a portion not penetrating rubber into the center of the core is created, and consequently when external injury is suffered in the tire, the corrosion is apt to be enlarged through propagation of water along such a portion. Furthermore, when the number of steel filaments for the core is 4 or more, it is difficult to hold the symmetry and also the distribution of stress becomes ununiform in the deformation of the cord to cause the degradation of fatigue resistance. On the other hand, when the number of steel filaments for the sheath is less than 6, if it is intended to provide the strength required for holding the internal pressure, the diameter of the steel filament should be made large, and consequently fatigue resistance is degraded. When the number of steel filaments for the sheath exceeds 8, the penetration of rubber into the inside of the cord is poor and a risk of coming out the steel filament is caused.

In order to obtain a satisfactory holding property of internal pressure, it is preferably that Dc and Ds are not less than 0.22 mm, respectively. If Dc exceeds 0.44 mm or Ds exceeds 0.50 mm, the fatigue resistance is undesirably degraded. Further, in order to obtain an effective strength, it is preferable that the twisting pitch Ps of the sheath is not less than 12 mm. If the twisting pitch exceeds 22 mm, the properties of the cord are degraded to cause the degradation of work operability. Moreover, in order to obtain effective strength while holding the tension bearing balance between core and sheath, it is favorable that a ratio of Ps to twisting pitch Pc of the core satisfies the following relationship:

$$1.0 \leq Ps/Pc \leq 4.0$$

In order to satisfactorily provide the holding property of internal pressure at a small number of steel filaments, it is preferable to enhance the tensile strength of the steel filament. For this end, it is favorable that a carbon content in the steel filament is within a range of 0.80–0.90% by weight.

As mentioned above, the steel cord according to the invention has a two-layer structure of the core and the single sheath. In this case, it is required that the twisting direction of the core is same as in the twisting direction of the sheath, whereby cord fatigue due to the fretting is prevented. Similar results are obtained by wrapping a spiral filament around the outside of the sheath of the above steel cord in a direction opposite to the twisting direction thereof.

According to the invention, the reason why the bending rigidity B of the steel cord is restricted to not less than 100 kg.mm$^2$ is due to the fact that when B is less than 100 kg.mm$^2$, the growth of crack in the cord during the running becomes large and the effect of improving the BES resistance is not obtained.

In the steel cord according to the invention, it is required that the breaking load S satisfies a relationship represented by the following equation:

$$S \geq 110 \times (0.6+D)$$

because the sufficient internal pressure is first held when the above relationship is satisfied. When the steel cord is applied to tires for truck and bus used on bad road under heavy load, it is preferable to satisfy the following relationship:

$$S \geq 130 \times (0.6+D)$$

The above breaking load S of the cord is obtained by drawing high carbon steel having a C content of 0.80–0.90% by weight while the reduction ratio is controlled to a proper value of not less than 94%.

According to the invention, it is required that the steel cords are arranged so that a distance G between the adjoining cords is within a range of 0.6–2.0 mm in the belt layer. G is measured from the edge of one cord to the adjacent edge of the next cord. When G is less than 0.6 mm, cracks produced around adjoining cords are apt to be connected to each other and BES is easy to be caused. While, when G exceeds 2.0 mm, the rigidity of the belt decreases to degrade the steering property of the tire and the wear resistance. Moreover, G can be represented by the following equation:

$$G = 50/T - D$$

wherein T is an end count of cords per 5 cm and D is a diameter (mm) of the cord.

In order to provide sufficient rubber penetrability, it is preferable to hold a gap among the steel filaments in the sheath by setting the ratio of filament diameter Ds of the sheath to filament diameter Dc of the core to the following relationships:

when the number of steel filaments for the sheath is 6, Ds/Dc $\leq$ 1.65;
when the number of steel filaments for the sheath is 7, Ds/Dc $\leq$ 1.15; and
when the number of steel filaments for the sheath is 8, Ds/Dc $\leq$ 0.9.

An embodiment of the steel cord according to the invention is shown in FIGS. 1 to 6. FIG. 1 illustrates a steel cord having a two-layer structure of a core 1 comprising two steel filaments having the same diameter and a sheath 2 comprised of six steel filaments having a diameter larger than that in the core. FIG. 2 illustrates a steel cord having a two-layer structure of a core 1 comprising two steel filaments having the same diameter and a sheath 2 comprised of seven steel filaments having the same diameter as in the core. FIG. 3 illustrates a steel cord having a two-layer structure of a core 1 comprising two steel filaments having the same diameter and a sheath 2 comprising eight steel filaments having a diameter smaller than that in the core.

In FIGS. 4 to 6 are shown modification embodiments of FIGS. 1 to 3, in which a spiral filament 3 is wrapped around the steel cord, respectively.

The following examples are given in illustration of the invention and are not intended as limitations thereof.

There were prepared various radial tires 4 for truck and bus having a tire size of 1000R20 as shown in FIG. 7, and the rubber penetrability, fretting depth and BES resistance were evaluated with respect to these tires. In FIG. 7, numeral 5 is a bead portion, numeral 6 a sidewall portion, numeral 7a shoulder portion, numeral 8 a tread portion, numeral 9 bead wire, numeral 10 a carcass ply and numeral 11 a belt portion. In these tires, the end count of cords in the belt portion 11 was set to a strength of 5500 kg per 5 cm required for holding sufficient internal pressure.

The rubber penetrability was evaluated by removing the steel filaments of the sheath from the steel cord taken out from a new tire to leave only the core and measuring the rubber coating ratio at the surface of the core from a microphotograph as A being more than 60%, B being 35-60% and C being less than 35%. The rubber penetrability is required to be not less than the evaluation B in case of general-purpose use condition and not less than the evaluation A in case of severe use condition, while when it is not more than the evaluation C, the separation failure is apt to be caused due to the coming-out of the core and penetration of water from the injured portion.

The resistance to fretting was evaluated as follows. At first, the tire was actually run over a distance of 100,000 km. Then, the cord was taken out from the belt layer of the run tire and the coating rubber was removed off with a solvent and then steel filaments were disengaged one by one. After each steel filament was subjected to a measurement of breaking load, the fracture face of the filament was set in a microscope to obtain a microphotograph and a section paper was placed on the microphotograph so as to depict a circle along a portion causing no fretting, from which a quantity h of fretted portion 13 was measured as a unit of $\mu m$ with respect to the portion 12 causing no fretting as shown in FIG. 8. Moreover, the fretting quantity was represented by an average value of 10 cords.

The resistance to fretting in Table 1 was indicated by an index that the control tire was 100. The larger the index value, the smaller the fretting quantity.

The BES resistance was evaluated by observing the inside of the tire cut after the running when the connected cracks at the belt end is inacceptable (X).

The measured results are shown in Table 1.

TABLE 1

| No. | 1 | 2 | 3 | 4 | 5 |
|---|---|---|---|---|---|
| Steel cord | | | | | |
| twisting structure | 3 + 9 + 15 + 1 | 3 + 6 | 3 + 6 | 3 + 9 | 3 + 9 |
| carbon content (%) | 0.72 | 0.72 | 0.82 | 0.82 | 0.82 |
| filament diameter (mm) | 0.23/0.23/0.23/0.15 | 0.20/0.38 | 0.20/0.36 | 0.36/0.36 | 0.28/0.28 |
| cord diameter (mm) | 1.42 | 1.19 | 1.15 | 1.50 | 1.16 |
| twisting pitch (mm) | 6/12/18/5 | 10/18 | 10/18 | 9/18 | 16/16 |
| (twisting direction) | | (z/s) | (z/s) | (s/z) | (s/s) |
| bending rigidity B (kg · mm$^2$) | 96.4 | 165.8 | 134.7 | 257.2 | 94.1 |
| distance between cords (mm) | 1.37 | 0.44 | 0.53 | 1.29 | 0.91 |
| breaking load (kg) | 306 | 179 | 185 | 306 | 228 |
| end count (cords/5 cm) | 18.0 | 30.7 | 29.7 | 18.0 | 24.1 |
| Evaluation of performances | | | | | |
| rubber penetrability | C | C | B | A | C |
| resistance to fretting | 100 | 70 | 80 | 80 | 220 |
| BES resistance | X | X | X | ○ | X |
| Remarks | conventional example | conventional example | conventional example | comparative example | comparative example |

| No. | 6 | 7 | 8 | 9 | 10 | 11 | 12 |
|---|---|---|---|---|---|---|---|
| Steel cord | | | | | | | |
| twisting structure | 2 + 6 | 2 + 6 | 2 + 7 | 2 + 7 | 2 + 7 | 2 + 8 | 2 + 8 |
| carbon content (%) | 0.82 | 0.82 | 0.82 | 0.82 | 0.82 | 0.82 | 0.82 |
| filament diameter (mm) | 0.30/0.40 | 0.30/0.35 | 0.38/0.38 | 0.34/0.34 | 0.30/0.30 | 0.40/0.34 | 0.34/0.28 |
| cord diameter (mm) | 1.4 | 1.30 | 1.52 | 1.36 | 1.20 | 1.48 | 1.24 |
| twisting pitch (mm) | 8/16 | 8/16 | 8/16 | 8/16 | 8/16 | 8/16 | 8/16 |
| (twisting direction) | (s/s) | (s/s) | (s/s) | (s/s) | (s/s) | (s/s) | (s/s) |
| bending rigidity B (kg · mm$^2$) | 216.7 | 135.6 | 239.5 | 153.5 | 93.5 | 201.8 | 96.9 |
| distance between cords (mm) | 0.75 | 0.54 | 0.93 | 0.73 | 0.53 | 0.96 | 0.60 |
| breaking load (kg) | 237 | 203 | 269 | 230 | 190.5 | 268 | 203 |
| end count (cords/5 cm) | 23.2 | 27.1 | 20.4 | 23.9 | 28.9 | 20.5 | 27.1 |
| Evaluation of performances | | | | | | | |
| rubber penetrability | A | A | A | A | A | A | A |
| resistance to fretting | 170 | 170 | 170 | 180 | 190 | 170 | 190 |
| BES resistance | ○ | X | ○ | ○ | X | ○ | X |
| Remarks | acceptable example | comparative example | acceptable example | acceptable example | comparative example | acceptable example | comparative example |

As seen from the test results of Table 1, in the radial tires according to the invention, the rubber penetrability in the steel cord for the belt reinforcement is good and the resistance to fretting is considerably improved and the BES resistance is excellent, so that the excellent effect on the durability and the retreading property is sufficiently developed.

What is claimed is:

1. A pneumatic radial tire comprising a carcass ply containing cords arranged substantially in a radial direction of the tire and a belt superimposed about said carcass ply and comprised of plural belt layers each containing steel cords arranged at a cord angle of 5°–20° with respect to an equator of the tire, characterized in that:

(a) said steel cord has a two-layer structure comprising a core composed of two steel filaments and a single sheath surrounding said core and composed of 7 steel filaments, in which a twisting direction of said core is the same as a twisting direction of said sheath, and satisfies the following relationships:

$$0.22 \leq Dc \leq 0.44 \text{ (mm)},$$

$$0.22 \leq Ds \leq 0.50 \text{ (mm)},$$

$$12 \leq Ps \leq 22 \text{ (mm)},$$

$$1.0 \leq Ps/Pc \leq 4.0$$

wherein Dc is a diameter of steel filament in the core, Pc is a twisting pitch of the core, Ds is a diameter of steel filament in the sheath and Ps is a twisting pitch of the sheath;

(b) said steel cord has a bending rigidity B of not less than 100 kg.mm² calculated from the following equation:

$$B = 1.3 \times \Sigma_i B_i = 1.3 \times \Sigma_i (\pi D_i^4/64) \times 20{,}000$$

wherein $B_i$ is a bending rigidity of each steel filament and $D_i$ is a diameter of each steel filament;

(c) said steel cord has a breaking load S (kgf) satisfying the following relationship:

$$S \geq 110 \times (0.6 + D)$$

wherein D is a diameter of steel cord;

(d) said steel cords are arranged so that a distance G between adjoining cords is within a range of 0.6–2.0 mm in said belt layer; and (e) said steel cord satisfies the following relationship:

$$Ds/Dc \leq 1.15.$$

2. The pneumatic radial tire according to claim 1, wherein said steel cord is wrapped with a spiral filament in a direction opposite to the twisting direction of said sheath.

3. The pneumatic radial tire according to claim 1, wherein said tensile strength S satisfies the following relationship:

$$S \geq 130 \times (0.6 + D)$$

* * * * *